United States Patent [19]

Roberts

[11] 4,262,410

[45] Apr. 21, 1981

[54] PROTECTOR REMOVAL TOOL

[76] Inventor: Royce G. Roberts, P.O. Box 1296, Kenai, Ak. 99611

[21] Appl. No.: 965,908

[22] Filed: Dec. 4, 1978

[51] Int. Cl.[3] .......................... B08B 9/02; B23P 19/04

[52] U.S. Cl. .................................... 29/560; 29/33 T; 29/240; 81/57.2; 81/57.33; 279/109; 279/118; 294/106; 414/776; 15/104.04

[58] Field of Search ........................ 29/560, 33 T, 240; 279/7, 4, 106, 107, 109, 118; 414/776, 730; 294/88, 106, 115; 15/88, 104.03, 104.04, 104.05; 81/57.15, 57.19, 57.2, 57.31, 57.33

[56] References Cited

U.S. PATENT DOCUMENTS

| | | | |
|---|---|---|---|
| 3,144,947 | 8/1964 | Pittwood | 414/730 |
| 3,312,496 | 4/1967 | Boutelle et al. | 294/88 X |
| 3,436,783 | 4/1969 | McCartney | 15/104.05 X |
| 3,733,080 | 5/1973 | Zeidler | 279/4 |
| 4,011,617 | 3/1977 | Toelke et al. | 15/88 |
| 4,014,062 | 3/1977 | Scott et al. | 15/104.04 |

*Primary Examiner*—Z. R. Bilinsky
*Attorney, Agent, or Firm*—Marcus L. Bates

[57] ABSTRACT

Apparatus for removing protective members from the threaded ends of pipe joints. A rotating head assembly is attached for longitudinal movement respective to a main frame having a motor mounted therewithin. The head includes a plurality of protector gripping jaws which are radially spaced from one another and aligned such that movement of the head assembly towards and away from the main frame causes the jaws to releasably grip the pipe protector. The rotating head assembly includes spaced parallel arms connected to cause the jaws to maintain the same relative position as the jaws are moved apart from one another to accommodate different diameter pipe. The apparatus can also be used to engage and remove pipe couplings as well as other threaded members. A second embodiment of the invention includes a cleaning head assembly mounted to the main frame which cleans the threads of both the box end and pin end of the pipe. A drifter is extended through the interior of the pipe to assure that the inside diameter thereof is greater than a predetermined minimum value.

15 Claims, 16 Drawing Figures

PROTECTOR REMOVAL TOOL

THE PRIOR ART

Rawdon U.S. Pat. No. 841,047 discloses a manually held power driven wrench. A fluid operated motor is in line with, and drives a four jaw chuck. Members 20 protrude outwardly of the chuck body.

Stoffels U.S. Pat. No. 3,861,252 shows a fluid operated chuck for gripping a pipe with jaws 60. Jaws 60 are moved to an opened or closed position by pressure operated cylinders 70. After the chuck engages the pipe, the entire chuck and pipe are rotated by motor 28 and reduction gear 28 (FIG. 1).

Johansen U.S. Pat. No. 2,594,028 sets forth a chuck mechanism for gripping a drill stem 16 and then rotating same. Note how sliding cross-head 11 carries the chuck mechanism and is hydraulically movable via cylinders 4. The chuck mechanism employs a plurality of toggle links (FIG. 4). Bevel gear 17 rotates the drill stem.

Steinberger U.S. Pat. No. 3,815,929, in FIG. 1, shows a fluid operated piston *5a* driving pivoted levers which cause the jaws *3c* of a chuck to move to an opened or closed position. The chuck is rotated by means of motor 17.

Goldry U.S. Pat. No. 3,952,384 reveals a power operated three jaw chuck for gripping a pipe. Fluid operated piston 26 engages one end of the pivoted jaw to cause the other end to engage the pipe.

Swanson U.S. Pat. No. 3,730,539 relates to a hydraulically actuated chuck for gripping a work piece, which work piece is later rotated, for machining purposes. FIG. 1 shows a fluid operated piston 52, urging rod 54 against one end of a pivoted jaw 18, to raise or lower the jaw. A plurality of jaws grip the work.

Leibowits U.S. Pat. No. 2,764,050 involves a three jaw chuck for engaging a nut or bolt for removal by rotation. Jaws 8 of the lever arms 2 grip the work. The lever arms 2 pivot about pins 6 with a rotating wedge means 1 causing the jaws to open or close.

Van Schalk U.S. Pat. No. 3,706,255 shows a manually operated hydraulic tool having jaws which open or close. Note the various linkages employed to operate the jaws.

Fouse U.S. Pat. No. 2,908,114 teaches a hydraulic device to operate jaws which grip an object. Various links are employed in the apparatus.

Weller U.S. Pat. No. 351,550 sets forth a clamping device having a linkage arrangement of interest.

BACKGROUND OF THE INVENTION

When pipe is transferred from one geographical location to another, the threads thereof must be protected against damage which might result from handling and from the deleterious effects of the ambient. Oilfield pipe, especially drill pipe and production tubing, may be handled many times during its life, and the removal and replacement of the thread protectors at each end of the pipe joints requires a substantial amount of labor.

When the joints of pipe are transferred longitudinally along the axial centerline thereof; for example, as the pipe is being manufactured, or as the pipe is being electronically inspected; the ends of the pipe are disposed such that ready access may be had to the protector device located on either end thereof. It would therefore be desirable to be able to economically and efficiently remove or attach the protectors from either end of the pipe, as the pipe is being conveyed during either of these processes.

It would also be desirable to clean the threaded box and pin ends of the pipe during the above process, and thereafter measure the uniformity of the interior of the pipe to assure that the inside diameter is of a minimum value.

Such a desirable expedient is the subject of this invention.

SUMMARY OF THE INVENTION

A tool for rotating co-acting threaded members to enable the members to be made up and broken out respective to one another. The tool comprises a plurality of circumferentially spaced-apart jaw means for releasably engaging and rotating one of the co-acting threaded members.

A first and a second plurality of arm members are arranged for moving the jaw means radially towards one another and into gripping contact with the threaded member. The arm members are attached to first and second rotatable mount members which impart rotational motion into the jaw members. The first and second rotatable mount members are movable towards and away from one another.

One end of each arm member is journaled to one of the jaw means. The other end of the first plurality of arm members is journaled to the first rotatable mount member, while the other end of the second plurality of jaw members is journaled to the second rotatable mount member. The first and second rotatable members are mounted to the marginal end of a motor-driven rotatable shaft, with the first mount member being arranged to be reciprocated along a marginal, medial portion of the shaft. Means attached to structure associated with the motor moves the first rotatable member towards and away from the second rotatable member, thereby causing the arms to move the jaws toward and away from one another.

In a more specific form, the first plurality of arms are arranged such that parallel pairs of arms have the ends thereof connected between the second mount member and the jaws, thereby causing the jaws to remain orientated in the same direction as the jaws move toward and away from one another. Another arm interconnects the jaws to the first rotatable member so that movement between the first and second rotatable members imparts pivotal motion into the parallel arms.

In another embodiment of the invention, the main frame is connected to be moved laterally away from the longitudinally traveling pipe and then the tool is rotated 180° in a vertical plane which lies along the longitudinal axial centerline of the pipe. The tool is thereby repositioned to engage and remove the remaining protector from the pin end of the pipe.

In still another embodiment of the invention, a cleaning head is mounted in cooperative relationship respective to the main frame with the cleaning head being axially aligned with the end of one pipe while the jaws of the tool are aligned with the end of an adjacent pipe. The cleaning head engages and cleans the threads of one pipe end simultaneously with the removal of a protector device from the end of an adjacent pipe.

In still a further embodiment of the invention, a gauging tool is positioned to be telescopingly received within a pipe as the pipe travels away from the tool, thereby assuring that the pipe interior is of a predetermined minimum value.

Accordingly, a primary object of the present invention is the provision of apparatus for rotating co-acting threaded members to enable the members to be made up and broken out respective to one another.

A further object of the present invention is the provision of method and apparatus by which couplings and pipe protectors and the like may be removed from or threadedly made up to the end of a joint of pipe while simultaneously cleaning the threaded pipe ends.

A still further object of this invention is the provision of a machine for releasably engaging and turning a threaded member.

Another and still further object of the present invention is the provision of method and apparatus by which a threaded member can be removed from either end of a joint of pipe, while another threaded end of a pipe is being cleaned.

An additional object of this invention is the provision of an apparatus for removing pipe protectors from the threaded ends of a joint of pipe.

A further object of this invention is the provision of a machine having a shaft-mounted, rotating head assembly with radially-spaced jaws being moved towards and away from one another by manipulation of the head assembly so that the jaws can releasably engage and rotate a rotatable member.

These and various other objects and advantages of the invention will become readily apparent to those skilled in the art upon reading the following detailed description and claims and by referring to the accompany drawings.

The above objects are attained in accordance with the present invention by the provision of a combination of elements which are fabricated in a manner substantially as described in the above abstract and summary.

DETAILED DESCRIPTION OF THE PREFERRED EMBODIMENTS

Figure 1:
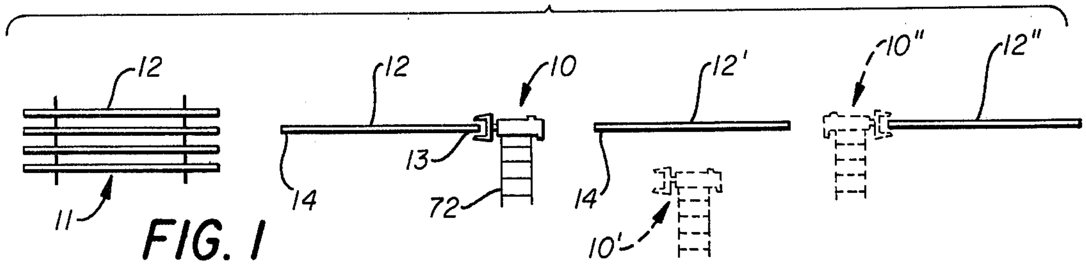
FIG. 1 diagrammatically sets forth a flow sheet which illustrates one form of the utility of the present invention.

In the embodiment of FIG. 1, the tool 10 of the present invention is seen to be positioned such that it obstructs a continual flow of longitudinally aligned pipe 12 traveling to or from a pipe rack 11. Pipe protectors are placed on opposed pipe ends 13 and 14.

The tool engages end 13 of the pipe to remove a protector therefrom. The tool is mounted to be moved along track 72 laterally away from the pipe as seen at 10', thereby enabling the pipe 12' to be conveyed past the tool. The tool is rotated 180° and repositioned at 10" to engage the other end 14 of the pipe at 12".

Figure 2:
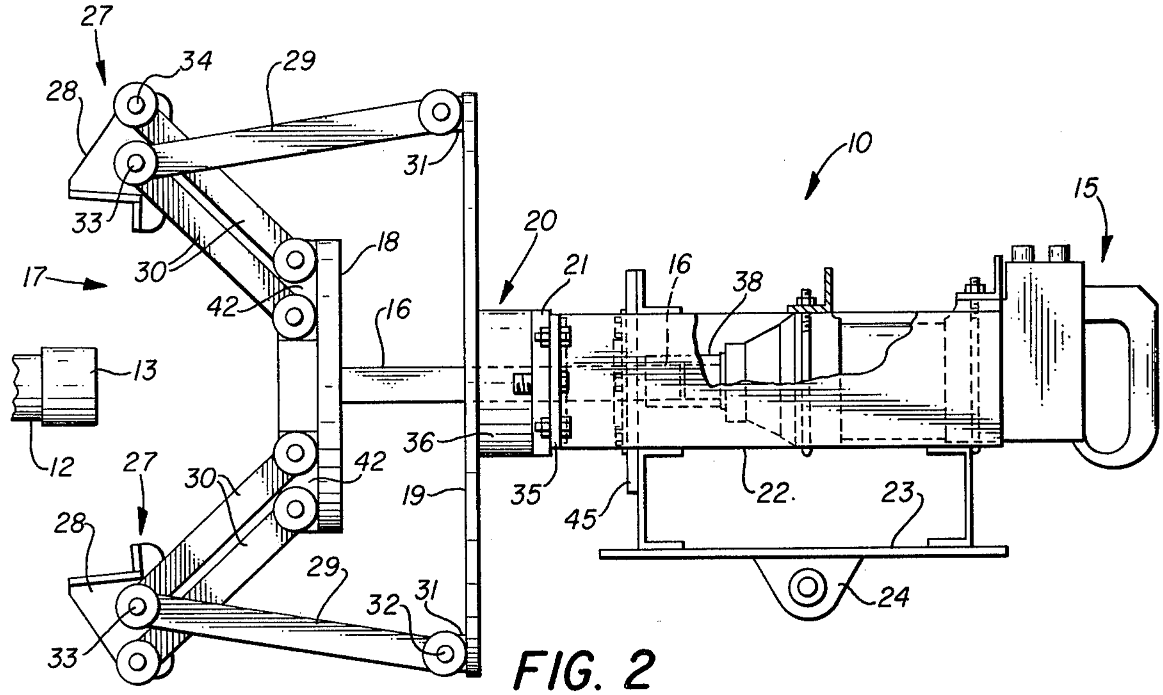
FIG. 2 is a part diagrammatical, part schematical, side view of apparatus made in accordance with the present invention, with some parts being broken away therefrom in order to better disclose the details thereof.

As seen in FIG. 2, the tool 10 includes an air motor 15 and is provided with a conventional gear reducer which drives a shaft 16. The shaft may be splined, as for example, an SAE 10 spline shaft, or may be square as noted in the drawings. A rotating head assembly 17 is provided for releasably gripping one of the two coacting threaded members of the pipe, such as pipe thread protectors or pipe couplings, in order that the coacting threaded members may be made up and broken out respective to one another. The threaded member illustrated herein is the before mentioned pipe and pipe protector.

Figure 3:
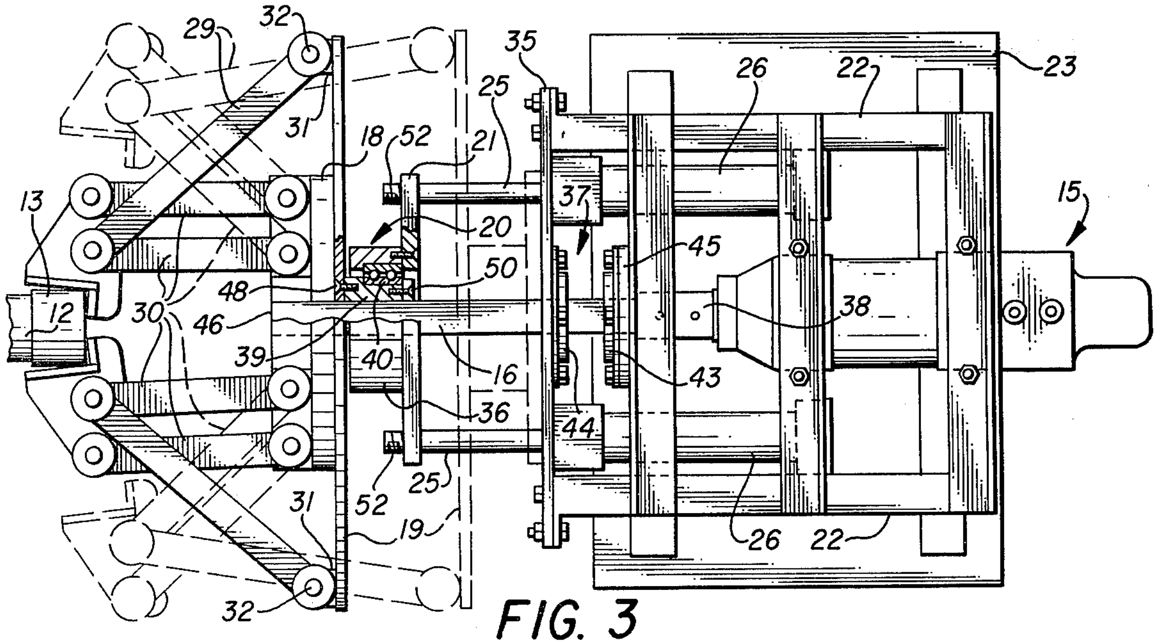
FIG. 3 is a top perspective view which further illustrates the details of the apparatus disclosed in FIG. 2.

As seen in FIGS. 2 and 3, a first mount member, in the form of a large mount plate 19, is spaced from a second mount member in the form of a small mount plate 18. A traveling bearing means 20 is affixed to a non-rotating mount member 21. The mount member is reciprocatingly moved in a slidable manner respective to the rotatable shaft and with respect to structure 22, which forms part of the main frame of the tool.

The motor is suitably mounted within the framework 22 and supported by a base 23. The base includes a lug 24 by which the entire machine can be rotated within a vertical plane and about an axis lying normal to the longitudinal axis of the shaft and pipe, thereby positioning the tool in either of the illustrated positions 10 or 10" of FIG. 1.

Figure 9:
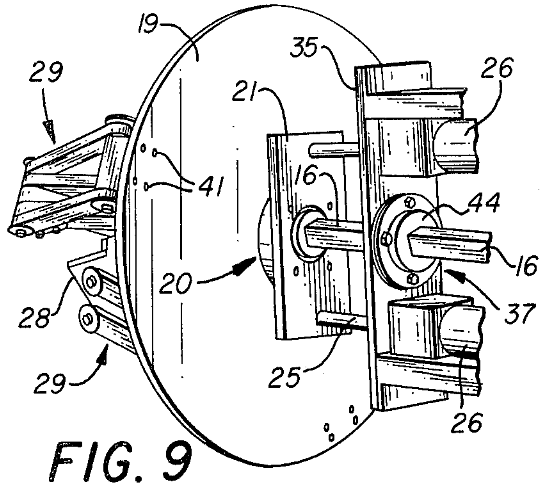
FIG. 9 is a rear perspective view of part of the apparatus disclosed in FIG. 3.

As seen in FIGS. 2, 3, and 9, spaced hydraulically-actuated cylinder assemblies include a piston 25 having the free end thereof attached to opposed sides of the reciprocating, nonrotatable mount member 21, while the cylinders 26 thereof are attached to a stationary plate 35, with the last named plate being attached to the main frame member 22. Hence, the hydraulic cylinders are mounted to move plate members 21 and 35 toward and away from one another as best seen illustrated in FIGS. 2 and 9.

Figure 10:
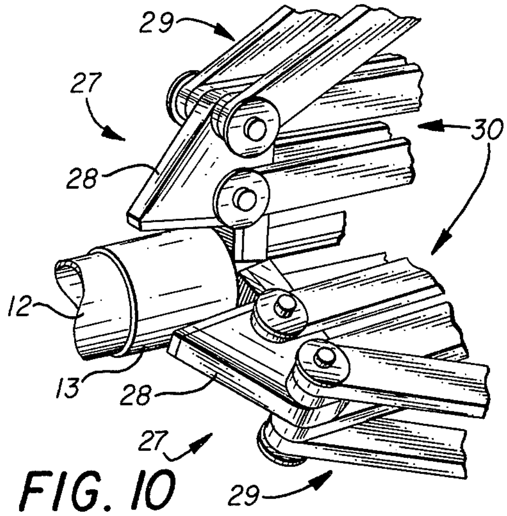
FIGS. 10 and 11 are enlarged, fragmented, perspective views illustrating the operation of part of the apparatus disclosed in some of the foregoing figures.
Figure 11:
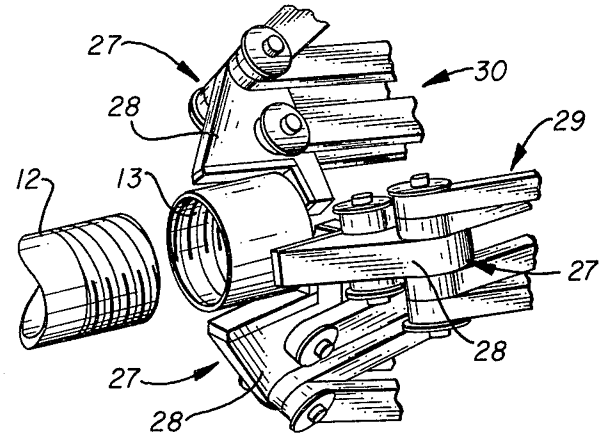
Figure 12:
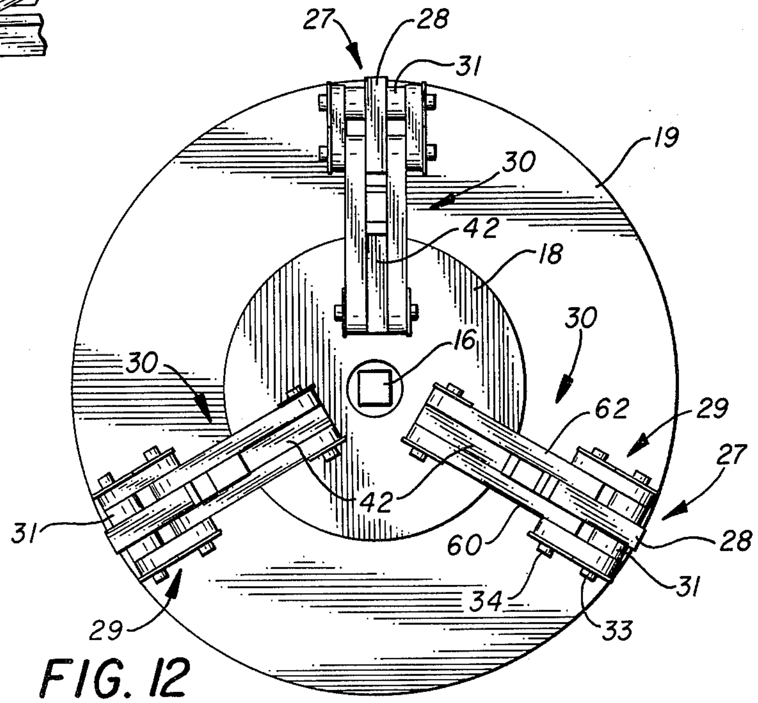
FIG. 12 is a front plan view which is similar to the illustration of FIG. 8.

As best seen in FIGS. 10 and 11, together with other figures of the drawings, one of a plurality of claw and arm assemblies 27 form the forward part of the rotating head assembly. The claw assembly includes a plurality of radially spaced jaws 28 to which there is connected an actuating arm 29 and a pair of idler arms 30, also hereinafter referred to as a first and a second plurality of arms.

As seen in FIGS. 6, 7, 8, and 12, in conjunction with other figures of the drawings, a block 31 is bolted onto one side of the plate 19 in spaced relationship to other similar blocks which are circumferentially spaced about the outer marginal, peripheral edge portion of the plate. Each block accepts a pin 32, thereby forming a journal means for one end of each of the before mentioned arms 29. It will be noted that arm 29 in the figures of the drawings comprises a pair of arms positioned on either side of the jaw and block, and the pair of arms are considered to fall within the comprehension of "an arm". The opposed end of arm 29 is journaled to the jaw at 33. The parallel arms 30 are journaled to the jaw at 33 and 34 with pin 33 being mutually shared by the outer end portion of arms 29 and 30.

As seen in FIGS. 2, 3, and 9, a bearing means 37 is supported from the before mentioned plate member 35 in spaced relationship respective to the traveling bearing housing 20. Bearing housing 37 includes a rotating inner bearing part 44. Coupling 38 interconnects the gear reduction output shaft to the square drive shaft 16.

Figure 4:
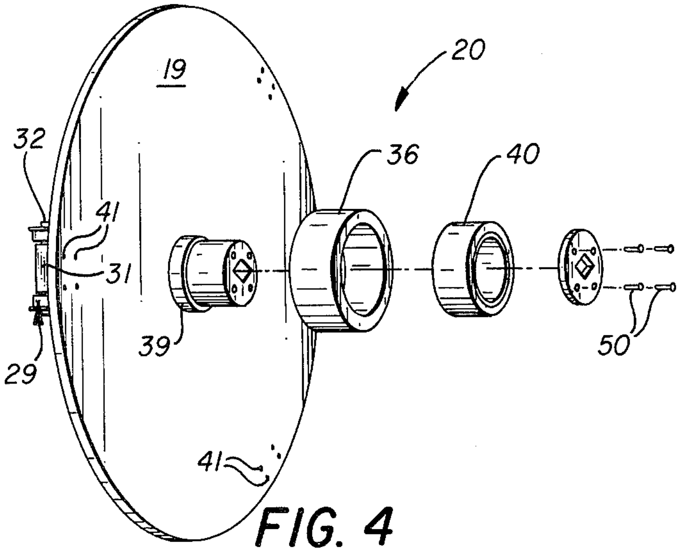
FIG. 4 is a perspective, exploded detail of part of the machine illustrated in the foregoing figures.
Figure 5:
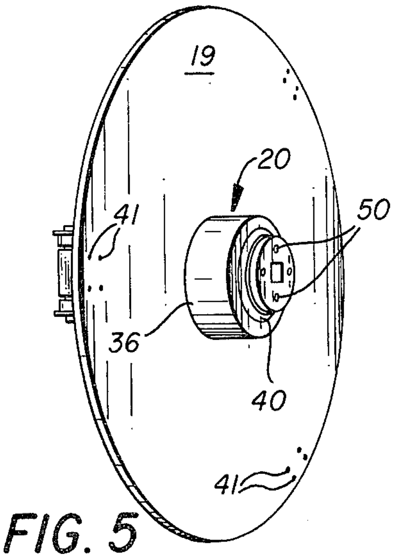
FIG. 5 shows the apparatus of FIG. 4 in assembled configuration.
Figure 6:
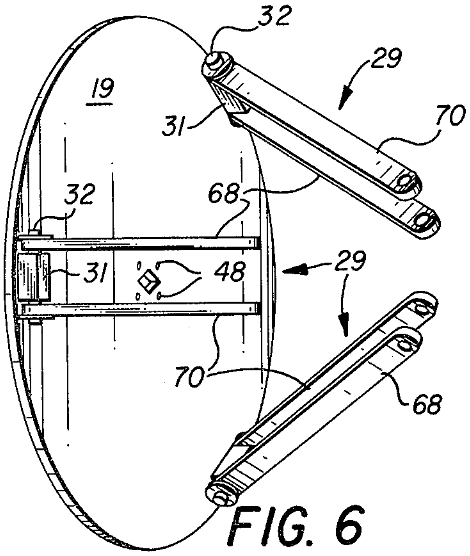
FIGS. 6 and 7 are partially disassembled, perspective views of part of the apparatus located on the opposite side of the apparatus disclosed in FIG. 5.

Looking now to FIGS. 4–8, which disclose the details of the large plate member 19 and the associated slidable bearing housing 20, there is seen a hub member 39 which is affixed to plate 19 and which slidably receives a medial marginal length of the power output shaft 16. Bearing 40 admits low friction turning between the shaft and the outer housing 36 of the bearing means. In FIGS. 4 and 5, apertures 41 are placed 120° apart for receiving block 31. FIG. 6 discloses the opposed side of the large plate member and the location of the blocks 31.

Figure 7:
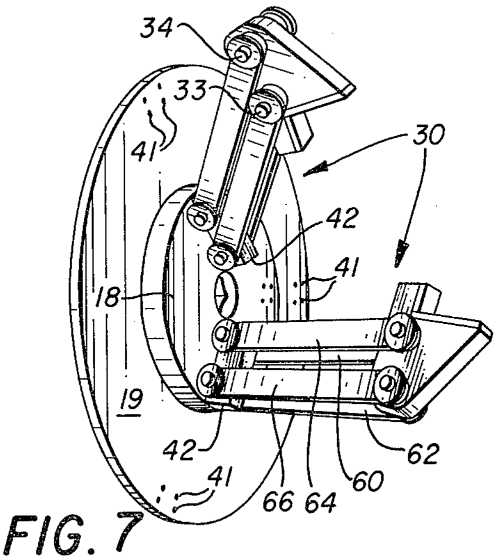
Figure 8:
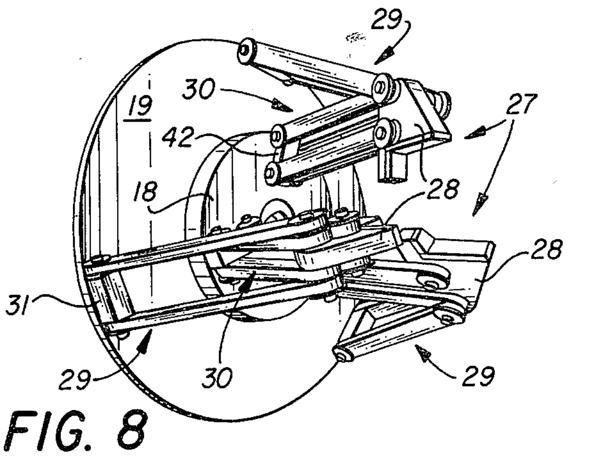
FIG. 8 is a front perspective view of part of the apparatus disclosed in FIGS. 2 and 3.

As seen in FIGS. 3, 7, and 8, the small plate member 18 is similarly provided with radially spaced blocks 42 so that the parallel arm assemblies can be journaled thereto.

In operation, the apparatus 10 for removing protective members from the threaded ends 13 and 14 of pipe joints 12 comprises a main frame member 22 to which a motor 15 is affixed to enable the shaft 16 to be rotated. The shaft has a splined connection at 39. The term "splined shaft" is intended to denote "a shaft having an irregular outer surface area", as for example, the illustrated square shaft.

The square shaft imparts rotaton into a first mount member 19, which is illustrated as being in circular form, and which can assume other geometrical configurations, so long as the radially spaced-apart actuating arms 29 are attached to and move therewith. The first mount member is slidably supported on the shaft. A second mount member 18, which is illustrated as being of a circular configuration, but which can take on several different forms so long as the central axis thereof is attached to the terminal end of the power output shaft and moves therewith.

The arms 30 are arranged in spaced parallel pairs to provide four arms for each jaw. The arms have one of the opposed ends thereof journaled to the second mount member and the other end journaled to the jaw. The actuating arm members 29 are pivotally connected to the innermost pivot pin of the jaw; and therefore, a common pin ties one end of the arms 29 and one end of one pair of the arms 30 to the jaw.

As the second member 18 is moved towards and away from the first member 19, the jaws move towards and away from one another, and the parallel relationship of the pairs of arms 30 maintain the jaw orientated in the same general direction as the jaws move towards and away from one another.

In the illustrated embodiment of FIG. 1, the apparatus is moved on a laterally disposed track, with the jaws concentrically arranged respective to the axial centerline of the pipe 12. The hydraulic cylinders 26 force the pistons 25 to extend therefrom, thereby moving the first mount member 19 towards the second mount member 18 to close the jaws about the protector. The air motor 15 is supplied with a suitable source of compressed air for causing the power shaft to rotate the entire head assembly, which rotates the pipe protector therewith, thereby removing the protector from the pipe end. The piston is next retracted within the cylinder, thereby moving plate members 18 and 19 apart, which cause the jaws to move radially away from one another, whereupon the protector is released and may be dropped onto a moving conveyor (not shown) located below the pipe.

The apparatus 10 moves laterally away from the pipe 12, 12′, so that the pipe can continue at 12′ on to station 21″ as the apparatus is pivoted at 24 from the position seen at 10 into a second position 10″. The apparatus 10′ is repositioned at 10″ into axially aligned relationship respective to the pipe so that the rotating head assembly can engage and remove the remaining protector from the other end of the pipe.

Figure 13:
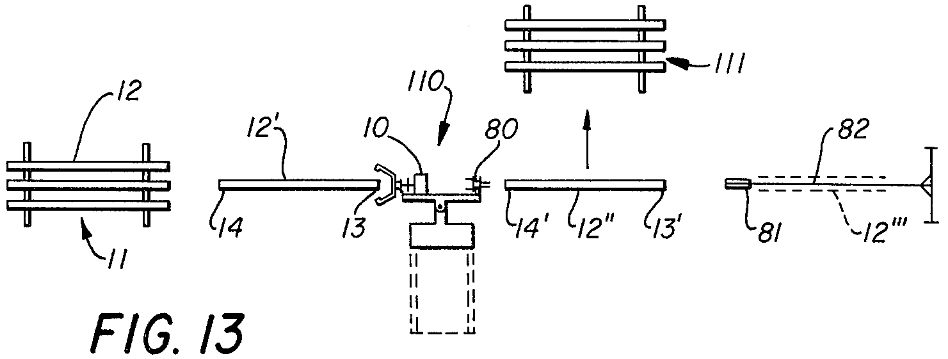
FIG. 13 is a diagrammatical illustration of another form of the present invention.

In the embodiment of the invention illustrated in FIG. 13, pipe 12 is stored on pipe rack 11 and conveyed at 12′ toward a tool 110 made in accordance with the present invention. The tool 110 includes apparatus 10 made in accordance with the first embodiment of the invention, and additionally includes a thread cleaning apparatus 80 mounted on the same framework therewith. The tool 10 removes a pipe protector from pipe end 13 while the tool 80 is cleaning the threads at pipe end 14′ and vice versa. The apparatus 110 can be retracted away from the line of travel of the pipe as the pipe moves from 12′ to 12″. The apparatus 110 is rotatable 180° in a vertical plane in order to reverse the relationship of the tools 10 and 80.

After the protectors have been removed from each end of the pipe, and the threads have been cleaned, the pipe continues along its longitudinal axial centerline causing a drift indicator 81 to telescopingly receive the pipe thereabout as indicated by numeral 12‴. Numeral 82 indicates a cantilever arm which supports the drift apparatus 81 in a manner to enable the apparatus to travel along the entire length of the pipe. Apparatus 81 is a commercially available drifting device which determines the minimum inside diameter of the pipe.

After the pipe has been drifted, it is returned to position 12″ and then moved laterally onto pipe rack 111.

Figure 14:
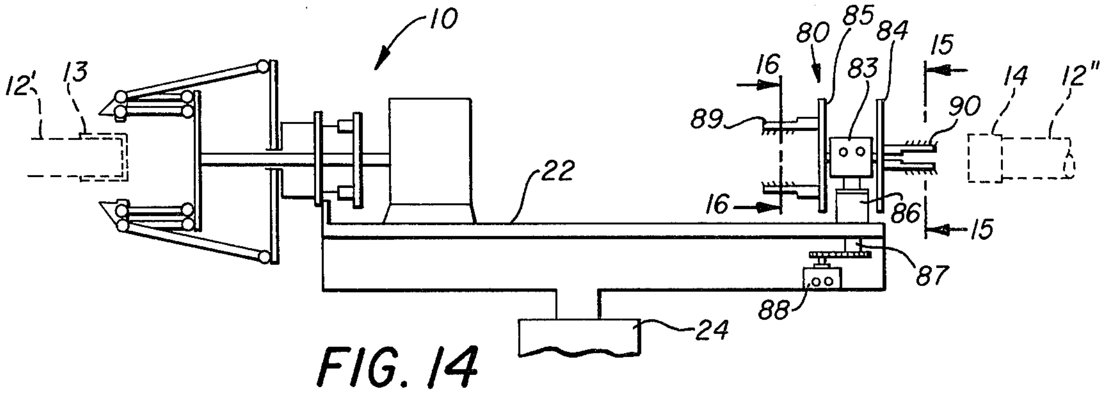
FIG. 14 is a detailed, side elevational view of part of the apparatus seen in FIG. 13.

In FIG. 14, the tool 10 is schematically illustrated mounted on main framework 22 as in the before described manner of FIGS. 1–12. Apparatus 24 rotates the entire framework to describe a vertical plane which lies along the longitudinal axial centerline of pipe 12′, 12″, 12‴. Hence, the tools 10 and 80 change their relative position in order that each tool can sequentially work on each end of the pipe in the above described manner.

As seen in FIG. 14, the cleaning tool 80 includes a hydraulically actuated motor 83 which concurrently rotates plate members 84 and 85 about the centers thereof. Motor support 86 rotatably mounts motor 83 to the main frame so that when shaft 87 is rotated 180° by motor 88, plate members 84 and 85 change their relative positions. Stated differently, shaft 87 is rotatably received within housing 86 and rotates motor 83 within a plane which coincides with the axial centerline of pipe joints 12′ and 12″. The centers of plates 84 and 85 are axially aligned and coincide with the center of the shaft of tool 10 when the cleaning tool 80 is in either of the above described alternant positions.

Radially spaced brushes 89 are adjustably affixed to and extend from the outer face of plate member 85, while radially spaced brushes 90 are adjustably affixed to the outer face of plate member 84. The outer faces of the plates are diametrically opposed to one another.

Figure 15:
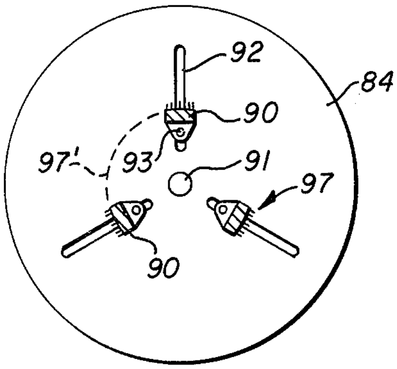
FIG. 15 is a cross-sectional view taken along line 15—15 of FIG. 14; and, FIG. 16 is a cross-sectional view taken along line 16—16 of FIG. 14.

As seen in FIG. 14, the motor 83 has opposed shaft ends, one of which is seen at 91 in FIG. 15. Radially arranged slots 92 adjustably receive the brush members 90. A fastener means 93 is received through the slot by which the brushes 90 is fastened to the plate member 84 along any desired circumference measured radially from the shaft 91. The cleaning surface 97 of the brushes 90 is arranged to frictionally engage the inside threaded wall surface 97' of the end of a pipe joint; that is, the box end of the pipe joint.

Figure 16:
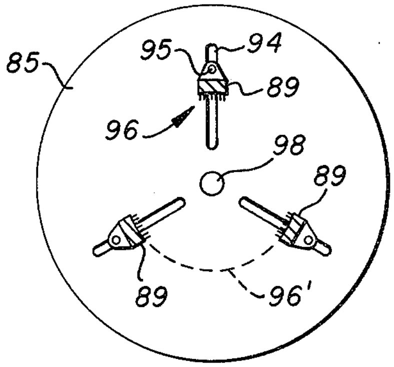

In FIG. 16, the radially spaced brushes 89 are adjustably attached to plate member 85 by means of fastener 95 received through radially arranged slot 94. The brushes may be moved towards and away from one another to position the cleaning surface 96 thereof along a circumference 96' so that the cleaning surface of the brushes can frictionally engage the outer threaded surface of a pipe joint; that is, the pin end of the pipe joint.

In operation, joints of pipe are racked at 11 and transferred in series relationship by a conventional conveyor system towards the apparatus 110. The tool 10 engages the pipe protector at pipe end 13, unscrews the protector, and drops it onto an underlying moving conveyor (not shown). The pipe ends are moved apart, the tool 110 reversed 180°, the pipe ends are moved towards one another, whereupon the tool 10 engages the protector at pin end 14', and the protector is dropped onto the conveyor.

Simultaneously with the removal of the protector from pipe end 14', the cleaning tool 80 engages and cleans the threads of pipe end 13. The tool 110 is again rotated 180° and the remaining end 14' is cleaned.

After the protectors are removed and the threads of the pipe ends have been properly cleaned, the apparatus 110 moves laterally away from the longitudinal axial centerline of the pipe supported upon the conveyor, and the pipe 12'' is moved by the conveyor to telescopingly receive the drifter 81 to assure that the inside diameter is of a minimum value. The pipe is moved from 12''' back to position 12'' and then moved laterally onto the pipe rack 111. Meanwhile, pipe 12 and 12' are positioned at 12' and 12''.

Each time the main frame 22 is rotated 180° by apparatus 24, shaft 87 is simultaneously rotated 180° to change the operative relationship of the brushes 89 and 90 respective to one another. Thus, the cleaning device of the apparatus 110 is repositioned to properly receive the box or pin end of the next adjacent joint of pipe.

It is considered within the comprehension of the present invention to utilize the action of apparatus 24 rotating the main frame 180° in order to impart 180° of rotation into shaft member 87. This can be achieved by a stationary sprocket associated with rigid structure adjacent to motor 24, or alternatively, linkage and bell cranks can be connected to achieve 180° of rotational motion of shaft 87 each time the main frame is rotated by apparatus 24.

Moreover, it is considered within the comprehension of this invention to utilize a drive train from the motor of tool 10 in order to rotate shaft ends 91 and 98 of the cleaning tool 80.

The apparatus of the present invention enables a single operator to remove threaded members from the ends of pipe, clean the threaded ends of the pipe, drift the interior of the pipe, and thereafter move the pipe to a storage rack.

I claim:

1. Apparatus for removing protective members from the threaded ends of pipe joints comprising a main frame, a reciprocating bearing means, a rotating head assembly, an elongated shaft, means for imparting rotational motion into said shaft;

said head assembly includes a first mount member and a second mount member concentrically arranged in spaced relation to one another and axially arranged respective to said shaft; a plurality of gripping members, a plurality of long arms having one end affixed in journaled relationship to said first mount member, a plurality of short arms having one end affixed in journaled relationship to said second mount member; means by which each of said gripping members is journaled to the other end of one of said long arms and to the other end of one of said short arms;

means rotatably supporting said first mount member from said reciprocating bearing means, means for reciprocating said bearing means respective to said mean frame; said shaft having an end affixed to said second mount member;

whereby said first mount member can be moved respective to said main frame member, thereby changing the relative distance between the gripping members, while said gripping members are rotatably about the axial centerline of the shaft, so that the gripping members can jointly engage and rotate a threaded member respective to a complementary threaded member, and thereafter the gripping members can release the first recited threaded member.

2. The apparatus of claim 1 wherein said main frame includes journal means by which said shaft is rotatable supported therefrom, said means for reciprocating said reciprocating bearing means includes a plurality of actuator means radially spaced about said shaft and connected for reciprocal movement of said first mount member parallel to said shaft.

3. The apparatus of claim 2 wherein said short arms include a plurality of pairs of parallel arms radially spaced about the axial centerline of said shaft, each of said pairs of parallel arms are arranged such that the ends thereof which are journaled to said second mount member each lie along a common radial line drawn from the axial centerline of said shaft;

the other end of said pair of parallel arms are journaled to one of said gripping members such that the ends thereof lie along a common radial line drawn from the axial centerline of said shaft.

4. The apparatus of claim 3 wherein said gripping members are provided with jaws which face radially inwardly whereby movement of said first mount member towards said second mount member causes the jaws to travel radially inwardly towards one another so that the jaws jointly grip any object placed therebetween.

5. The apparatus of claim 4 wherein said shaft is splined along a marginal length thereof, said first mount member has a complementary splined connection formed thereon which slidably engages the spline of the shaft, thereby enabling the shaft to impart rotational energy into both said first and second mount members.

6. The apparatus of claim 5 and further including means by which said frame can be rotated 180° about an axis which lies normal to the axial centerline of the shaft;

and means by which said main frame member can be moved laterally respective to the axial centerline of the shaft;

whereby the jaws can engage and remove a threaded member attached to one end of a pipe joint, the apparatus can move laterally away from the pipe joint and rotate 180° respective thereto while the joint moves along its axial centerline, the apparatus can move laterally into axial alignment with the pipe and the jaws can then engage and remove another threaded member located on the other end of the pipe joint.

7. The apparatus of claim 1 wherein said short arms includes a plurality of pairs of parallel arms radially spaced about the axial centerline of said shaft, each of said pairs of parallel arms are arranged such that the ends thereof which are journaled to said second mount member each lie along a common radial line drawn from the axial centerline of said shaft;

the other end of said pair of parallel arms are journaled to one of said gripping members such that the ends thereof lie along a common radial line drawn from the axial centerline of said shaft.

8. The apparatus of claim 1 wherein said shaft is splined along a marginal length thereof, said first member has a complimentary splined connection which slidably engages the spline of the shaft thereby enabling the shaft to impart rotational energy into both said first and second mount members.

9. The apparatus of claim 1 wherein means are provided by which said main frame can be rotated 180° about an axis which lies normal to the axial centerline of the shaft;

and means by which said main frame member can be moved laterally respective to the axial centerline of the shaft;

whereby the jaws can engage and remove a threaded member from one end of a pipe joint, the apparatus can move laterally away from the pipe joint and rotate 180° respective thereto while the joint moves along its axial centerline, and the jaws can then be aligned to engage and remove another threaded member from the other end of the pipe joint.

10. The apparatus of claim 1 wherein said gripping members are provided with jaws which face radially inwardly towards the shaft whereby movement of said first mount member away from said second mount member causes the jaws to travel radially inwardly towards one another so that the jaws jointly grip any object placed therebetween;

said short arms include a plurality of pairs of parallel arms radially spaced about the axial centerline of said shaft, each of said pairs of parallel arms are arranged such that the ends thereof which are journaled to said second mount member each lie along a common radial line drawn from the axial centerline of said shaft;

the other end of said pair of parallel arms are journaled to one of said gripping members such that the ends thereof lie along a common radial line drawn from the axial centerline of said shaft.

11. The apparatus of claim 1 wherein a cleaning device for cleaning threads is mounted on said main frame;

said cleaning device includes a rotatable cleaning head having a cleaning element arranged about an axis which coincides with the axial centerline of the first recited shaft.

12. The apparatus of claim 1 and further including a cleaning device for cleaning pipe threads;

said cleaning device being mounted on said main frame and includes a cleaning head, means rotatably mounting said cleaning head along the longitudinal axial centerline of said shaft; said cleaning head includes a cleaning element radially spaced from said axial centerline which engages the threads of the pipe ends.

13. A machine for rotating coacting threaded members to enable the members to be made up and broken out respective to one another, said machine having a powered shaft which rotates about its axial centerline, a rotatable head assembly connected to be rotated by said shaft;

said head assembly having spaced first and second mount members, a first plurality of arms having one end journaled to said first mount member in radially spaced relationship respective to one another and a second plurality of arms having one end journaled to said second mount member in radially spaced relationship respective to one another;

said first and second mount members having a center lying along the axial centerline of the shaft;

a plurality of jaw means radially spaced from the axial centerline of the shaft; one of said first plurality of arms connecting one of said jaw means only to one of said mount means; one of said second plurality of arms connecting said jaw means to the other of said mount means only; there being one jaw means attached to one arm of said first plurality of arms and to one arm of said second plurality of arms;

and means for moving said mount means respective to one another along the axial centerline of the shaft, to thereby cause the jaw means to move radially respective to one another and to the shaft, so that the jaw means can engage and rotate one of the coacting threaded members.

14. A tool for rotating coacting threaded members to enable the members to be made up and broken out respective to one another comprising:

a plurality of circumferentially spaced-apart jaw means for releasably engaging one of the coacting threaded members;

a first and a second plurality of arm members for moving said jaw means radially towards one another and into gripping contact with the threaded member;

first and second rotatable members for imparting rotational motion into said jaw members; means for moving said first and second rotatable members toward and away from one another;

one end of each arm member of said first and second arm members being journaled to said jaw means; the other end of said first plurality of said arm members being journaled to said first rotatable member, the other end of said second plurality of said arm members being journaled to said second rotatable member;

whereby said rotatable members can be moved towards one another to thereby move the jaws together, and the rotatable members can be rotated to cause the jaws to rotate about a common axis;

and further including a cleaning device for cleaning the threaded members; a main frame; a cleaning head having a cleaning element circumferentially disposed about a center; means by which said cleaning device and said tool are mounted to said main frame such that the shaft and the center lie along a common axial centerline.

15. The tool of claim 13 and further including a cleaning device for cleaning the threaded members; a main frame; a cleaning head having a cleaning element circumferentially disposed about a center; means by which said cleaning device and said tool are mounted to said main frame such that the shaft and the center lie along a common axial centerline.

* * * * *